(12) United States Patent
May

(10) Patent No.: US 12,164,342 B2
(45) Date of Patent: Dec. 10, 2024

(54) ADJUSTABLE KEYBOARD FOR FRONT AND BACK TYPING

(76) Inventor: Parker May, Clifton, VA (US)

( * ) Notice: Subject to any disclaimer, the term of this patent is extended or adjusted under 35 U.S.C. 154(b) by 341 days.

(21) Appl. No.: 12/939,969

(22) Filed: Nov. 4, 2010

(65) Prior Publication Data

US 2012/0112931 A1    May 10, 2012

(51) Int. Cl.
*G06F 1/16*    (2006.01)
*G06F 3/02*    (2006.01)

(52) U.S. Cl.
CPC .......... *G06F 1/1664* (2013.01); *G06F 1/1666* (2013.01); *G06F 1/1667* (2013.01); *G06F 3/0216* (2013.01)

(58) Field of Classification Search
CPC .. H04M 2250/18; G06F 1/1618; G06F 1/162; G06F 1/1622; G06F 1/1624; G06F 1/1664–1/1671; G06F 3/0216
USPC ...................... 341/20–22; 361/679.11–679.16
See application file for complete search history.

(56) References Cited

U.S. PATENT DOCUMENTS

| | | | | |
|---|---|---|---|---|
| 6,005,496 A | * | 12/1999 | Hargreaves | G06F 3/0202 400/475 |
| 6,118,432 A | * | 9/2000 | Kotorov | G06F 3/0202 345/168 |
| 6,297,752 B1 | | 10/2001 | Ni | |
| 6,697,055 B1 | * | 2/2004 | Bullister | 345/168 |
| 6,781,819 B2 | | 8/2004 | Yang | |
| 6,822,854 B2 | | 11/2004 | Te Maarssen et al. | |
| 6,983,175 B2 | * | 1/2006 | Kwon | 455/575.1 |
| 7,006,015 B2 | * | 2/2006 | England | 341/22 |
| 7,184,802 B2 | | 2/2007 | Chadha | |
| 7,199,313 B1 | * | 4/2007 | Kemppinen | 200/5 A |
| 7,612,989 B2 | * | 11/2009 | Northway | 361/679.16 |
| 8,072,427 B2 | * | 12/2011 | Pletikosa et al. | 345/169 |
| 8,208,245 B2 | * | 6/2012 | Staats et al. | 361/679.02 |
| 8,457,564 B2 | * | 6/2013 | Champion | 455/90.3 |
| 8,582,280 B2 | * | 11/2013 | Ryu | 361/679.14 |
| 2002/0085038 A1 | | 7/2002 | Cobbley et al. | |
| 2004/0208681 A1 | * | 10/2004 | Dechene | G06F 1/169 400/472 |
| 2005/0002158 A1 | * | 1/2005 | Olodort | G06F 1/1666 361/679.15 |
| 2005/0104855 A1 | | 5/2005 | Grossmeyer | |
| 2007/0103454 A1 | | 5/2007 | Elias | |
| 2008/0285214 A1 | * | 11/2008 | Kohmoto et al. | 361/680 |
| 2009/0153371 A1 | | 6/2009 | Griffin et al. | |

OTHER PUBLICATIONS

Nokia E70 Folding Typewriter Phone.

* cited by examiner

*Primary Examiner* — Brian Wilson
(74) *Attorney, Agent, or Firm* — Andrew C. Aitken

(57) ABSTRACT

One example embodiment includes a keyboard for providing back typing with a mobile device. The keyboard includes a keypad, where the first keypad includes a set of keys for input to a mobile device and a first hinge, where the first hinge is attached a first portion of the keypad and where the first hinge is configured to allow movement of the first portion of the keypad relative to the mobile device. The keyboard also includes a second hinge, wherein the second hinge is attached a second portion of the keypad and wherein the second hinge is configured to allow movement of the second portion of the keypad relative to the mobile device.

18 Claims, 11 Drawing Sheets

ADJUSTABLE KEYBOARD FOR FRONT AND BACK TYPING

CROSS-REFERENCE TO RELATED APPLICATIONS

This application is related to U.S. application Ser. No. 12/939,974, filed Nov. 4, 2010 and entitled "Modifier Keys in a Keyboard" that is now abandoned.

BACKGROUND OF THE INVENTION

The number of electronic devices used by the average man and woman is increasing rapidly. We use these electronic devices for work, for play, to communicate with one another and even to increase our safety. We use computers, televisions, cell phones, tablet PCs, iPods and other devices each day. Increasingly, the lines between these different devices are becoming blurred. For example, the functions that we associated strictly with computers are becoming more common on portable devices which now have computer, communication, and multimedia capabilities.

This increase in versatility has led to rapid advances in technology as device makers strive to increase the functionality of these devices. Portable electronic devices are becoming faster, smaller, more capable, and less expensive. Almost all aspects of these devices have changed in the recent past as new technologies are incorporated.

One portion of these devices remains almost completely constant, however. Keyboards have changed little as devices have changed. Indeed, the keyboard in use today is modeled after the same keyboard designed in 1874 for typewriters. That is, we are still using essentially the same keyboard orientation for computers and cell phones as was first developed over 135 years ago.

Even ignoring the constancy in orientation, modern keyboards all retain essentially the same wiring and, output signals that were developed for early computer keyboards. Additionally, external keyboards continue to have the drawback of requiring extra keys in order to modify the output of alphanumeric. That is, pushing a character key will result in the signal for that character to be sent over and over until the key is released. In order to change the output, a user must push a specifically designated modifier key that changes the output of other keys. Therefore these modifier keys modify the output of other keys but at the same time add extra keys to the keyboard. This severely limits the functionality of each key.

Additionally most keyboards do not allow, accidental or intended, simultaneous use of multiple alphanumeric keys. This eliminates the ability to produce output based on multiple keys being depressed at the same time. Further, keyboards remain front and center in most electronic devices. Despite that many typists can easily type without looking at the keyboard, especially when typing alphabetic characters, the keyboard continues to take up space in the front of electronic devices. As these devices become smaller, the keyboard takes an ever greater proportion of this front surface, a surface where space is at a premium for display.

Accordingly, there is a need in the art for a keyboard that has a smaller footprint that the traditional keyboard by removing little used keys. Additionally, there is a need for a keyboard that allows each key to perform multiple functions, thus retaining all of the functionality of traditional keyboards while eliminating one or more existing keys. Further, there is a need for a keyboard that can be used without stealing display space in electronic devices.

BRIEF SUMMARY OF SOME EXAMPLE EMBODIMENTS

This Summary is provided to introduce a selection of concepts, in a simplified form, that are further described below in the Detailed Description. This Summary is not intended to identify key features or essential characteristics of the claimed subject matter, nor is it intended to be used as an aid in determining the scope of the claimed subject matter.

One example embodiment includes a system for providing an adjustable keyboard. The system includes a keyboard panel. The keyboard panel includes a first keypad, where the first keypad includes a first set of keys for input to a mobile device, and a second keypad, where the second keypad includes a second set of keys for input to the mobile device. The system also includes a first swivel. The first swivel is attached to the first keypad and is configured to allow rotation of the first keypad. The system also includes a second swivel. The second swivel is attached to the second keypad and is configured to allow rotation of the second keypad.

Another example embodiment includes a system for use with a mobile device, where the system allows a user to back type on the mobile device. The system includes a mobile device, where the mobile device includes a front surface and a rear surface. The system also includes a first keypad on the rear surface, where the first keypad includes a first set of keys oriented in a horizontal direction, and a second keypad on the rear surface, where the second keypad includes a second set of keys oriented in the horizontal direction. The system further includes a third keypad on the rear surface, where the third keypad includes a third set of keys oriented in a vertical direction, and a fourth keypad on the rear surface, where the fourth keypad includes a fourth set of keys oriented in a vertical direction.

Another example embodiment includes a system for use with a mobile device, where the system allows a user to back type on the mobile device. The system includes a mobile device. The mobile device includes a front surface, where the front surface includes a display, and a rear surface, where the rear surface is opposite the front surface. The system also includes a keyboard panel. The keyboard panel includes a first keypad. The first keypad includes a first set of keys and a first swivel, where the first swivel is configured to allow the user to rotate the first keypad in the plane of the keyboard panel. The keyboard panel also includes a second keypad. The second keypad includes a second set of keys and a second swivel, where the second swivel is configured to allow the user to rotate the second keypad in the plane of the keyboard panel. The system also includes a hinge, where the hinge is configured to allow a user to move the keyboard panel from the front of the mobile device to the back surface of the mobile device.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
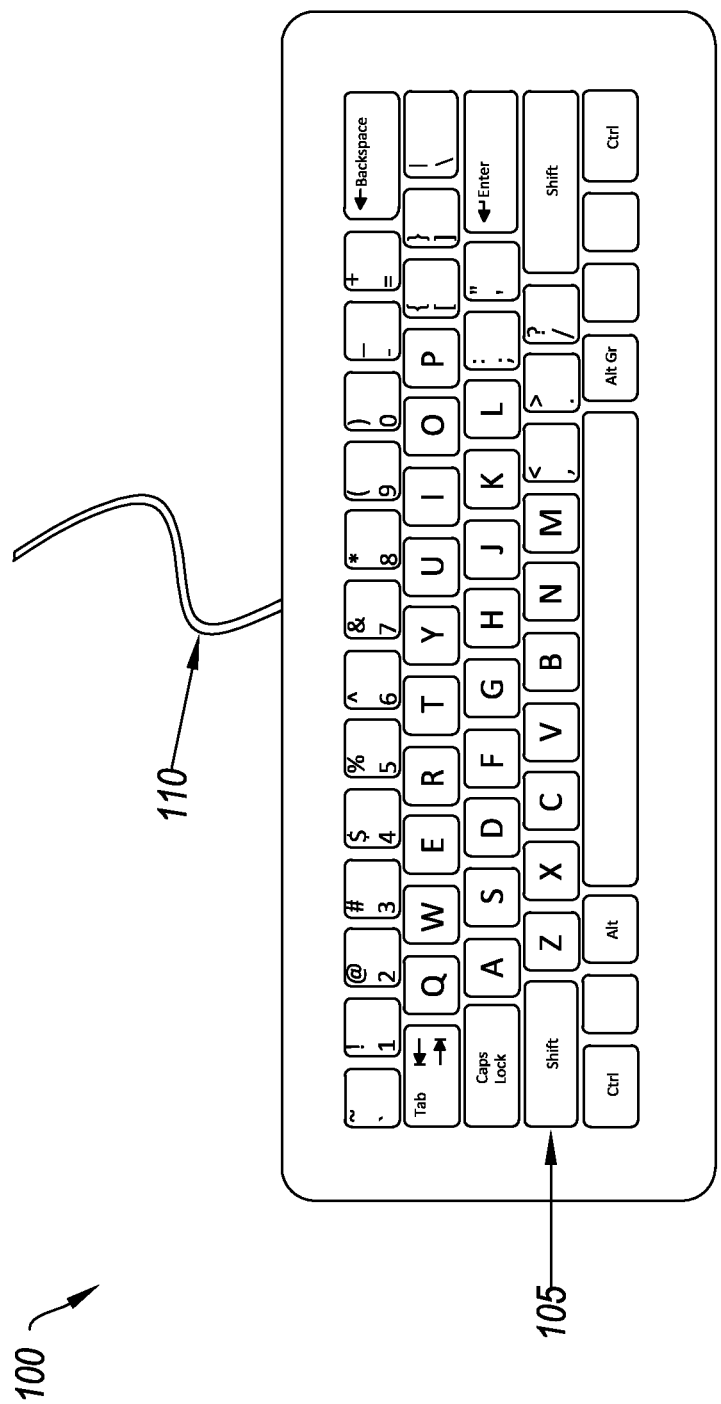
FIG. 1 illustrates an example of a keyboard for use with a mobile device.

FIG. 1 illustrates an example of a keyboard 100 for use with a mobile device. In at least one implementation, the keyboard 100 is an input device which allows a user to input data into the mobile device. For example, the keyboard 100 can allow the user to enter text, such as alpha-numeric characters or symbols, and commands for the mobile device. As used in the specification and the claims a mobile device includes any device that can be used in conjunction with a keyboard, including cell phone, computers, laptops, netbooks, tablet pcs and the like, unless otherwise specified.

FIG. 1 shows that the keyboard 100 can include an arrangement of keys 105 or buttons, to act as mechanical levers or electronic switches. The keys 105 can have characters engraved or printed thereon and each press of a key 105 can correspond to a single written symbol. However, as described below, pressing and holding several keys 105 simultaneously or in sequence can produce a signal which a single key 105 alone is unable to produce. For example, pressing a single key 105 can produce letters, numbers or signs (characters) while other keys 105 or simultaneous key presses can produce actions or computer commands.

In at least one implementation, the keys 105 can be arranged in a QWERTY arrangement. In a QWERTY arrangement, the keys 105 are arranged with the keys Q, W, E, R, T, Y, U, I, O, P and "[" arranged on a first row of the keyboard 100; the keys A, S, D, F, G, H, J, K, L, ";", and """ arranged on a second row of the keyboard 100, just below the first row; and the keys Z, X, C, V, B, N, M, ",", "." and "/" arranged on a third row of the keyboard 100, just below the second row. The second row can be offset to the right relative to the first row and the third row can be offset to the right relative to the second row, in the typical QWERTY layout.

FIG. 1 shows that the keyboard 100 can include additional keys 105. For example, the keyboard can include numeric keys 105. The numeric keys 105 can be arranged in a row above the first row of alphabetic keys 105, can be arranged as a keypad to the side of the alphabetic keys 105 or both.

The keyboard 100 can also include support or function keys. For example, the keyboard can include a space key, a tab key, a caps lock key, a shift key, a ctrl key, an alt key, function keys, navigation keys system keys, or other keys. One of skill in the art will appreciate that the size of the keys 105, the layout of the keys 105 and the function of the keys 105 can be modified without restriction and should not limit the scope of the claims, unless otherwise stated in the claims.

In at least one implementation, the keyboard 100 can include a dome switch keyboard or a direct-switch keyboard. Dome switch keyboards are a hybrid of flat-panel membrane and mechanical keyboards. They bring two circuit board traces together under a rubber or silicone keypad using either metal "dome" switches or polyester formed domes. The metal dome switches are formed pieces of stainless steel that, when compressed, give the user a crisp, positive tactile feedback. These metal types of dome switches are very common, are usually reliable to over 5 million cycles, and can be plated in nickel, silver or gold. The rubber dome switches, most commonly referred to as polydomes, are formed polyester domes where the inside bubble is coated in graphite. While polydomes are typically cheaper than metal domes, they lack the crisp snap of the metal domes, and usually have a lower life specification. Polydomes are considered very quiet; however, the collapsing dome does not provide as much positive response as metal domes.

When a key 105 is pressed, it collapses the dome, which contains a conductor on the bottom surface of the dome, until the dome comes into contact with a printed circuit board. The printed circuit board contains two circuit traces that are not in contact with one another. The conductor connects the two circuit traces and completes the connection to enter the appropriate character.

FIG. 1 also shows that the keyboard 100 can include a connector 110. In at least one implementation, the connector 110 can be used to connect the keyboard 100 to the mobile device. That is, the connector 110 can allow for communication from the keyboard 100 to the mobile device. Additionally or alternatively, the connector 110 can allow communication from the mobile device to the keyboard 100.

In at least one implementation, the connector 110 can send a character signal to the mobile device. I.e., if the "a" key is pressed and released, the connector 110 can send a signal corresponding to the "a" character. Additionally or alternatively, the connector 110 can send a signal corresponding to the key 105 pressed, regardless of the character on the key 105. For example, if the "a" key is pressed, the connector 110 can send a signal corresponding to the "left-most key on the home row." If the connector 110 sends a signal corresponding to the key 105 pressed, the placement and/or number of keys 105 on the keyboard 100 can be modified and the keyboard 100 can still send the correct signal, as described below.

Figure 2:
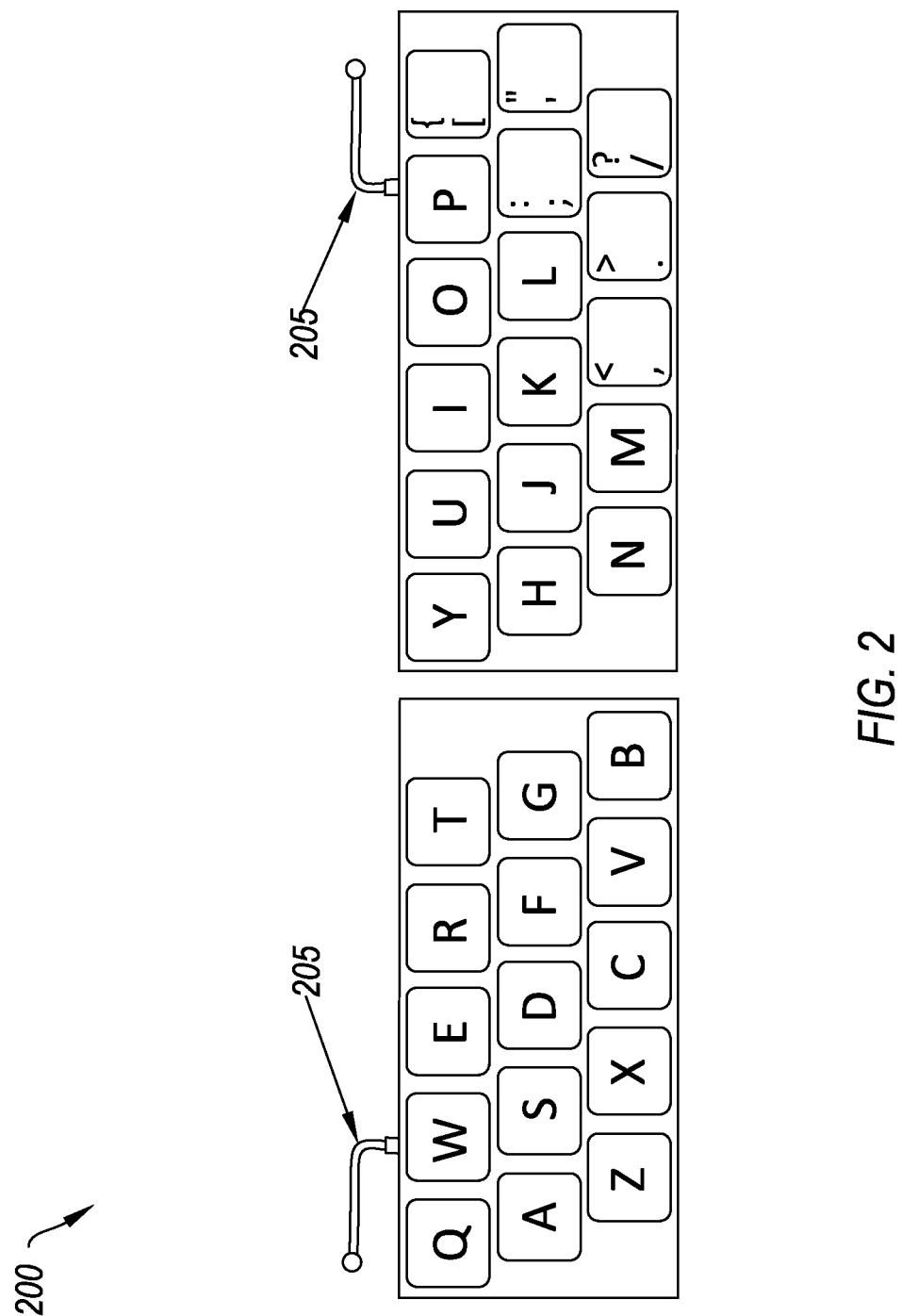
FIG. 2 illustrates an example of a keyboard containing only the core keys of a QWERTY keyboard.

FIG. 2 illustrates an example of a keyboard 200 containing only the "core" keys of a QWERTY keyboard. In at least one implementation, the footprint of the keyboard 200 can be smaller than the footprint of a full keyboard, such as the keyboard 100 of FIG. 1. A smaller footprint can allow the keyboard 200 to take less room on a mobile device than a full keyboard without losing functionality, as described below.

As used in the specification and the claims, the core keys of a QWERTY keyboard shall include a keyboard with the following characters: alphabetic characters (i.e., A-Z) and the characters ",", ".", "/", ";", "'" and "[", unless otherwise specified. In at least one implementation, the core keys of a keyboard 200 are the keys that an average user regularly uses without looking at the keyboard 200. That is, removing any of the core keys can make it difficult for a user to transition from a full QWERTY keyboard to a keyboard 200 that contains only the core keys.

FIG. 2 shows that the keyboard 200 can include a connector 205. In at least one implementation, the connector 205 can be used to connect the keyboard 200 to a mobile device. The connector 205 can allow for communication from the keyboard 200 to the mobile device. Additionally or alternatively, the connector 205 can allow communication from the mobile device to the keyboard 200.

In at least one implementation, the connector 205 can send the signal wirelessly or through a network. The network exemplarily includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network includes one or more cellular RF networks and/or one or more wired and/or wireless networks such as, but not limited to, 802.xx networks, Bluetooth access points, wireless access points, IP-based networks, or the like. The network can also include servers that enable one type of network to interface with another type of network.

In at least one implementation, the connector 205 can send the appropriate signal based on the combination of characters pressed, regardless of the layout of the keyboard. For example, if the keyboard 200 uses modifier keys, as discussed below, the connector 205 can send the appropriate signal to the mobile device when the appropriate combination of keys are pressed even though the actual key is not present on the keyboard 200. Thus, the keyboard 200 can send a full set of character signals to the mobile device even though the keyboard 200 only contains core keys.

Figure 3A:
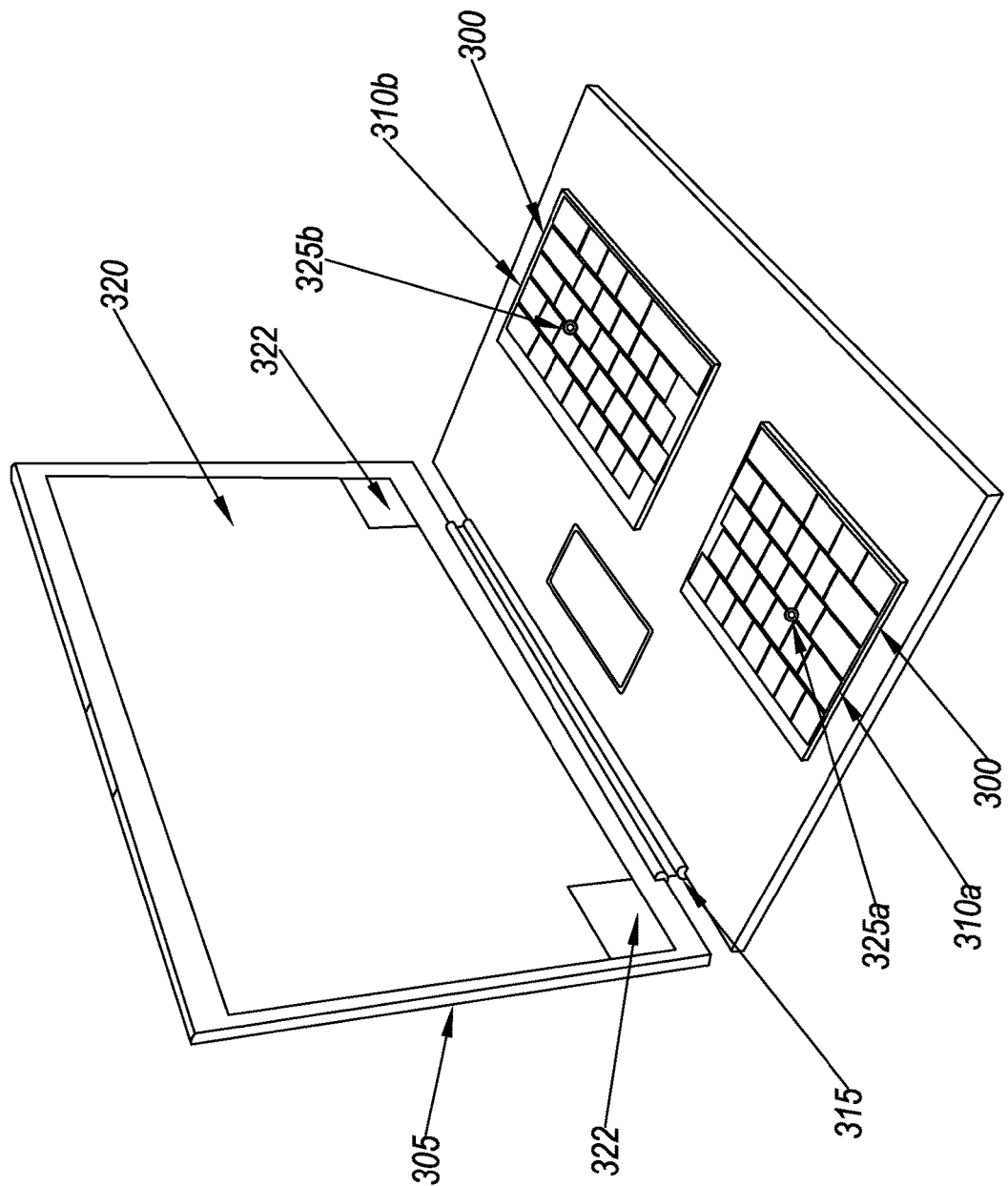
FIG. 3A illustrates an example of a keyboard panel that includes a touchpad above the keyboard panel.
Figure 3B:
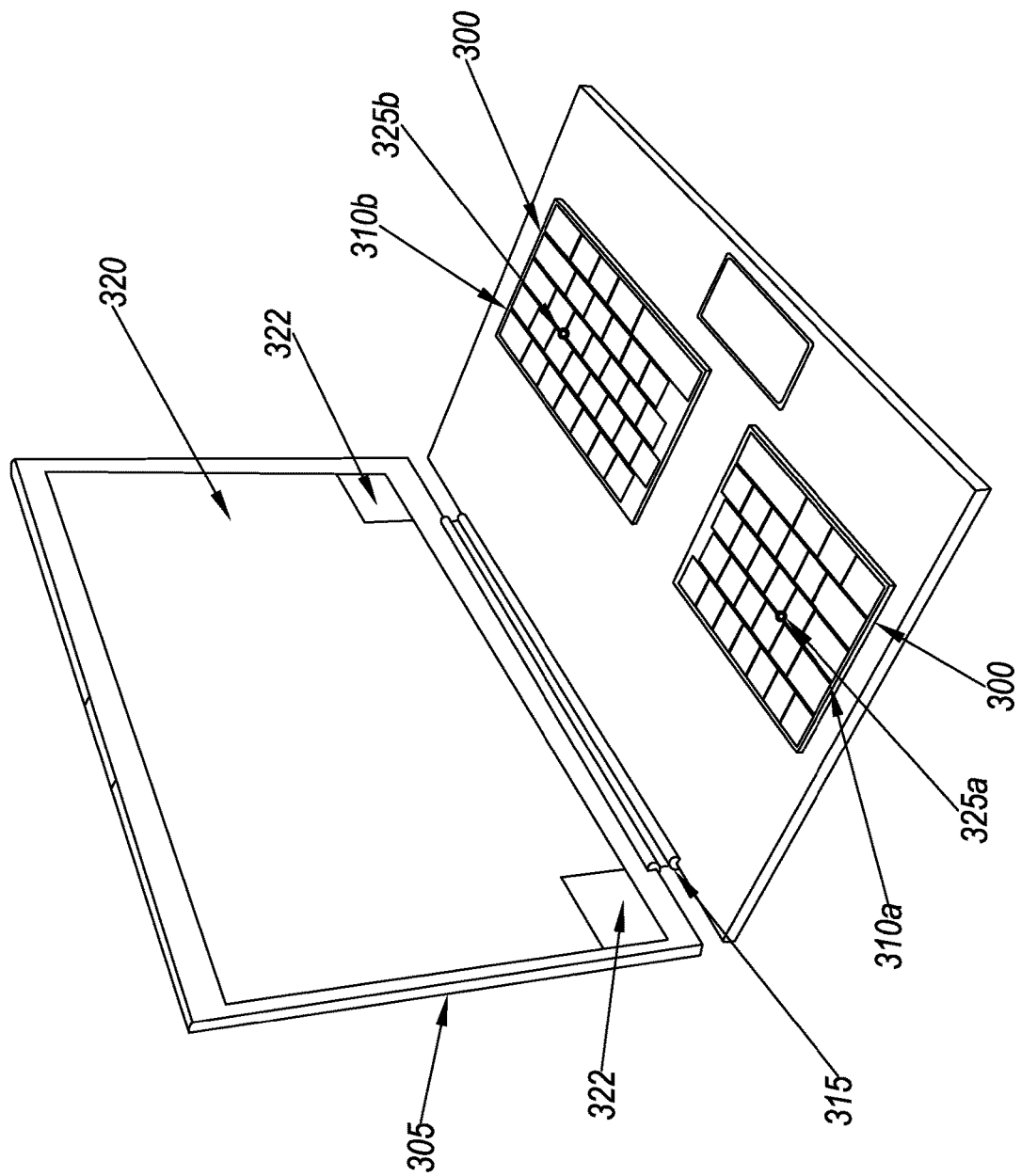
FIG. 3B illustrates an example of a keyboard panel that includes a touchpad below the keyboard panel.

FIGS. 3A and 3B illustrate an example of a keyboard panel 300 on a mobile device 305. FIG. 3A illustrates an example of a keyboard panel 300 that includes a touchpad above the keyboard panel 300; and FIG. 3B illustrates an example of a keyboard panel 300 that includes a touchpad below the keyboard panel 300. In at least one implementation, mounting the keyboard panel 300 on the mobile device 305 can allow the user to maintain the ability to input data to the mobile device 305 wherever the user takes the mobile device 305 without the need for an external keyboard.

The mobile device 305 can include any device that is configured to be transported on a regular basis by a user. For example, the mobile device 305 can include a portable computer such as an iPad, a laptop, a tablet PC, a notebook computer or a netbook. Additionally or alternatively, the mobile device 305 can include portable devices such as cell phones or personal digital assistants ("PDAs").

FIGS. 3A and 3B show that the keyboard panel 300 can be mounted directly on the mobile device 305. That is, the connection between the keyboard panel 300 and the mobile device 305 can be hidden from the user, and the keyboard panel 300 permanently attached to the mobile device 305. Additionally or alternatively, the keyboard panel 300 can be an external device connected to the mobile device 305.

In at least one implementation, mounting the keyboard panel 300 directly on the mobile device 305 can allow for direct communication between the keyboard panel 300 and the mobile device 305 without the need for an external connector. That is, the keyboard panel 300 can send electric signals to the mobile device 305 either through direct wiring or wirelessly. Additionally or alternatively, there can be an external connector between the keyboard panel 300 and the mobile device 305 either hidden from the user or visible to the user.

FIGS. 3A and 3B also show that the keyboard panel 300 can be divided into a first keypad 310a and a second keypad 310b (collectively "keypads 310"). Providing a first keypad 310a and a second keypad 310b can allow the user to type in a more natural fashion. In particular, providing left-hand 310a and 310b can allow a user to type with his/her hands apart and aligned, as they would naturally hold their hands while not typing. For example, each the first keypad 310a and the second keypad 310b can swivel, wither with one another or independently, to match the angle of the users forearm and wrist. In at least one implementation, the first keypad 310a can include the keys that a user types with his/her left hand. Further, the second keypad 310b can include the keys that a user types with his/her right hand.

FIGS. 3A and 3B further show that the mobile device can include a hinge 315. In at least one implementation, the hinge 315 allows the keyboard panel 300 to move relative to the mobile device 305. For example, the hinge 315 can include a double hinge that allows the keyboard panel 300 to fit flat against the front of the display 320 or the rear of the display 320. In particular, the keyboard panel 300 can serve as a base for the mobile device 305 and the hinge 315 can allow the display 320 of the mobile device 305 to move relative to the keyboard panel 300. Additionally or alternatively, the display 320 can remain stationary while the keyboard panel 300 moves about the hinge 315.

FIGS. 3A and 3B show that the display 320 can include one or more virtual touchpads 322. In at least one implementation, a virtual touch pad 322 can designate all or a portion of the display 320 as a touchpad. A touchpad (also trackpad) can include a pointing device consisting of specialized surface that can translate the motion and position of a user's fingers to a relative position on screen. The virtual touchpad 322 can allow a user to use his or her thumbs to navigate on the screen while back typing.

FIGS. 3A and 3B also show that the keyboard panel 300 can include a first swivel 325a for rotating the first keypad 310a and a second swivel 325b for rotating the right hand keypad 310b. In at least one implementation, providing a first swivel 325a and a second swivel 325b (collectively "swivels 325") can allow a user to position the first keypad 310a and the second keypad 310b. That is, the first swivel 325a and the second swivel 325b can allow a user to align the first keypad 310a and the second keypad 310b, respectively, in a preferred orientation.

In at least one implementation, allowing the user to swivel the first keypad 310a and the second keypad 310b can allow the user to type in a more comfortable configuration. This can, in turn, reduce the stress on the user's hands and wrists, lessening the chance for injury. Additionally or alternatively, allowing the user to swivel the first keypad 310a and the second keypad 310b can allow the user to position the keypads 310 for back typing, as discussed below.

Figure 4A:
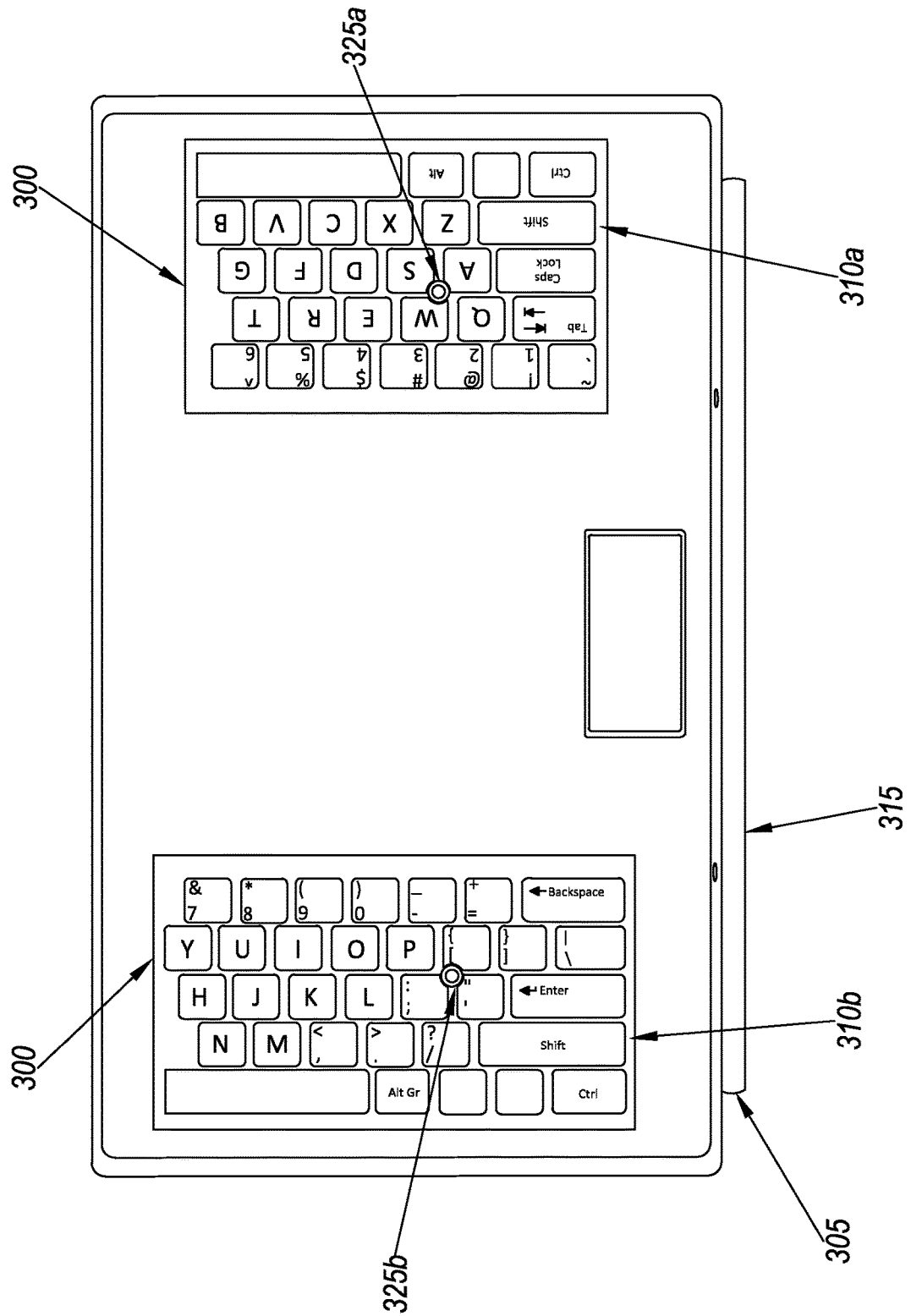
FIG. 4A illustrates the keyboard panel of FIG. 3A moved from the front of the mobile device to the back of the mobile device.
Figure 4B:
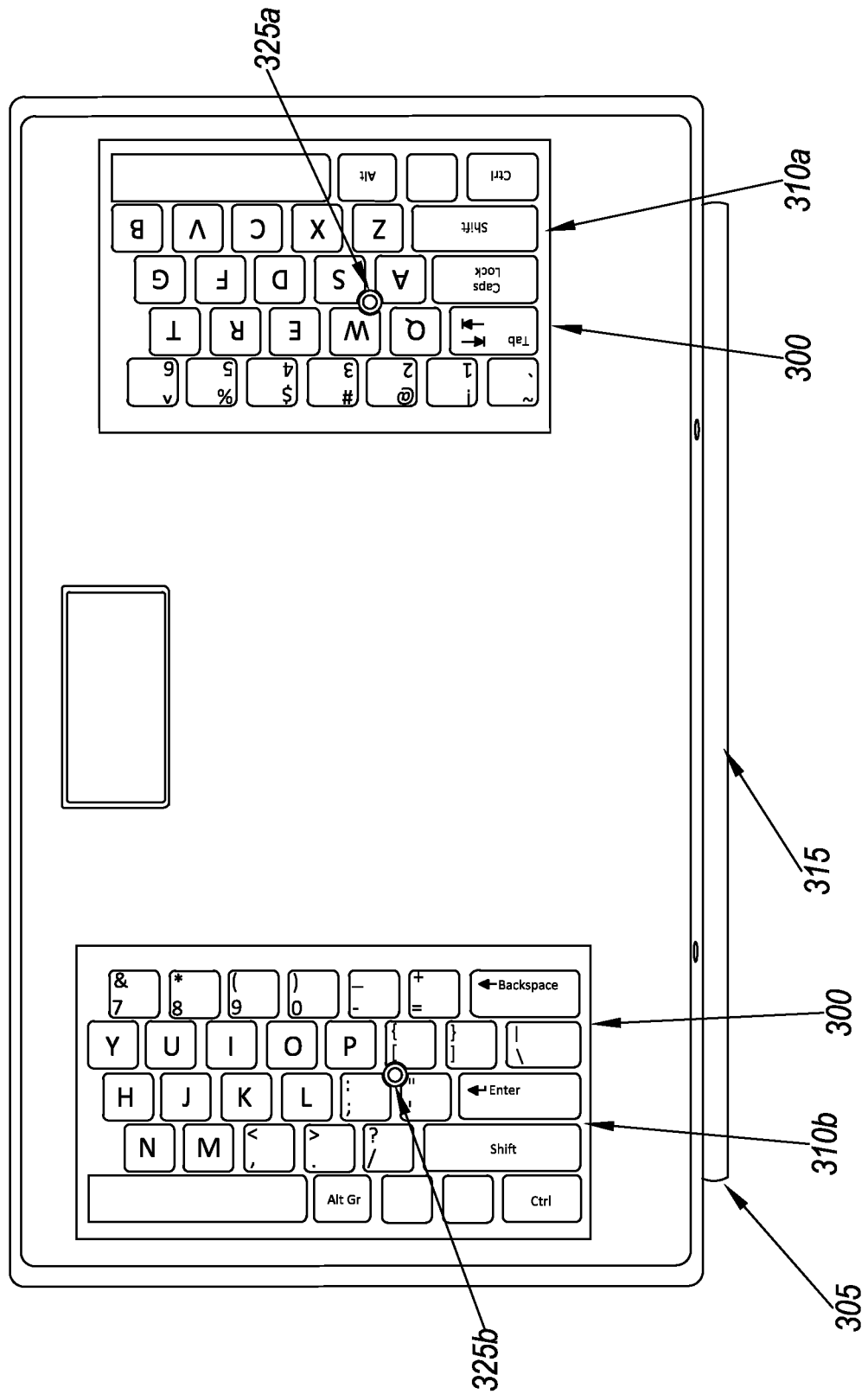
FIG. 4B illustrates the keyboard panel of FIG. 3B moved from the front of the mobile device to the back of the mobile device.

FIGS. 4A and 4B illustrate the keyboard panel 300 of FIGS. 3A and 3B moved from the front of the mobile device 305 to the back of the mobile device 305 for back typing. FIG. 4A illustrates the keyboard panel 300 of FIG. 3A moved from the front of the mobile device 305 to the back of the mobile device 305; and FIG. 4B illustrates the keyboard panel 300 of FIG. 3B moved from the front of the mobile device 305 to the back of the mobile device 305. As used in the specification and the claims, the front surface of the mobile device 305 includes a surface of the mobile device 305 that includes a display, unless otherwise indicated. As used in the specification and the claims, the front of the mobile device 305 includes the area in front of the display, whether on the front surface or not, unless otherwise indicated. As used in the specification and the claims, the back surface of the mobile device 305 includes a surface of the mobile device that is opposite the display, unless otherwise indicated.

FIGS. 4A and 4B show that the hinge 315 allows for the complete rotation of the keyboard panel 300 from the front surface of the mobile device 305 to the back surface of the mobile device 305. When the keyboard panel 300 is against the front surface of the mobile device 305, the keyboard panel 300 can act as a screen protector. When the keyboard panel 300 is rotated on the hinge 315, approximately 90 degrees from the front closed position the keyboard panel 300 can be used for front typing. When the keyboard panel 300 is against the back of the mobile device 305, the keypads 310 can be used for back typing.

Back typing can include any process in which the keyboard panel 300 is placed behind the mobile device 305 and the keys are not visible to the user. For example, back typing can include the user moving the keyboard panel 300 to the back of the mobile device 305. Additionally or alternatively, back typing can include typing on a mobile device 305 where the keyboard panel 300 is installed on the back of the mobile device 305, as described below. Additionally, the swiveling first keypad 310a and second keypad 310b may be integrated into the mobile device 305.

FIGS. 4A and 4B show that the first keypad 310a and the second keypad 310b can be rotated around swivels 320a and 320b. In at least one implementation, rotating the first keypad 310a and the second keypad 310b can allow the user to position the key pads 310 for more comfortable back typing. For example, the user can place the keypads 310 horizontally and use his/her hands to both support the bottom of the mobile device 305 and type with his/her hands. Additionally or alternatively, the user can place the keypads 310 vertically and use his/her hands to support the sides of the mobile device 305 and type with his/her hands. Additionally or alternatively, the user can have the keypads 310 in some other orientation. For example, the keypads 310 can be at a 45 degree angle to a horizontal orientation or at any other angle between horizontal and vertical.

Figure 5:
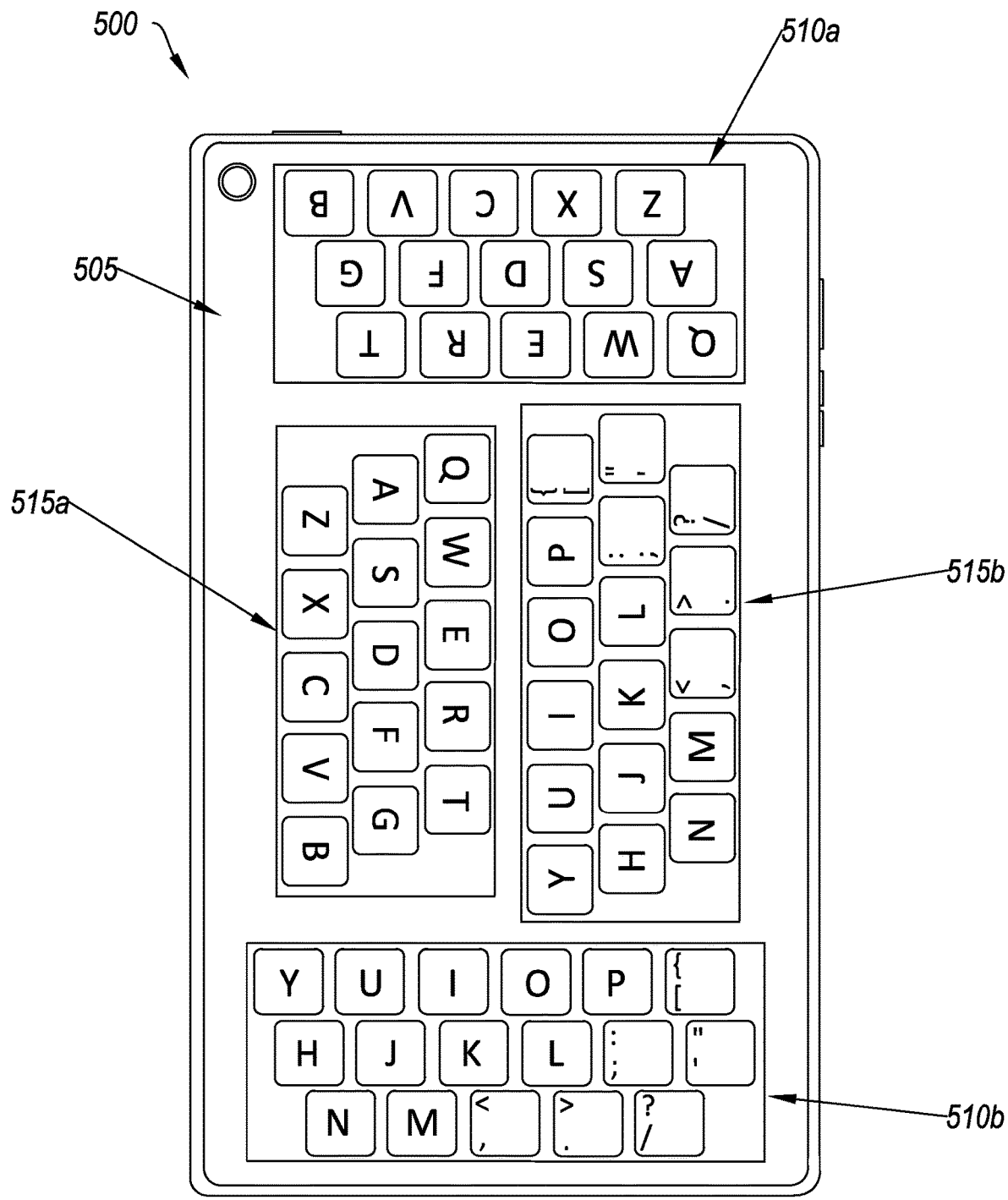
FIG. 5 illustrates an alternative embodiment of a keyboard panel for back typing.

FIG. 5 illustrates an alternative embodiment of a keyboard panel 500 for back typing. In at least one implementation, the keyboard panel 500 is located on the back of a mobile device 505, without a hinge, such as hinge 315 of FIGS. 3A and 3B, or other mechanism to move the keyboard panel 500 from the back of the mobile device 505 to the front of the mobile device 505. I.e., the keyboard panel 500 is permanently located on the back of the mobile device 505. Providing the keyboard only on the back surface of the mobile device 505 can allow a larger proportion of the front surface of the mobile device 505 to be used for display purposes.

FIG. 5 shows that the keyboard panel 500 can include a horizontal left-keypad 510a and a horizontal right-keypad 510b (collectively "horizontal keypads 510"). In at least one implementation, the user can use his/her hands to both support the bottom of the mobile device 505 and type with his/her hands using the horizontal keypads 510. Additionally or alternatively, the user can use his/her thumbs, near the front surface of the device, to use a touchpad located on the front of the mobile device 505.

FIG. 5 also shows that the keyboard panel 500 can include a vertical left-keypad 515a and a vertical right-keypad 515b (collectively "vertical keypads 515"). In at least one implementation, the user can use his/her hands to both support the sides of the mobile device 505 and type with his/her hands using the vertical keypads 515. Additionally or alternatively, the horizontal keypads 510 or the vertical keypads 515 can include a swivel or other mechanism which allows the user to change the orientation of the horizontal keypads 510 or vertical keypads 515. Additionally or alternatively, the user can use his/her thumbs, near the front surface of the device, to use a touchpad located on the front of the mobile device 505.

In at least one implementation, the keyboard panel 500 can include a touchpad or multiple touch pads on the same side as the keypads 510 and 515 to be used by the fingers of each hand. Each touch pad may include buttons or keys. Additionally or alternatively, other navigation devices may be included on the same side of the keyboard panel as the keypads. Additionally, keys on the keypads, when activated by a key press, may include touch sensitive surfaces that allow for navigation by use of the fingers.

Figure 6:
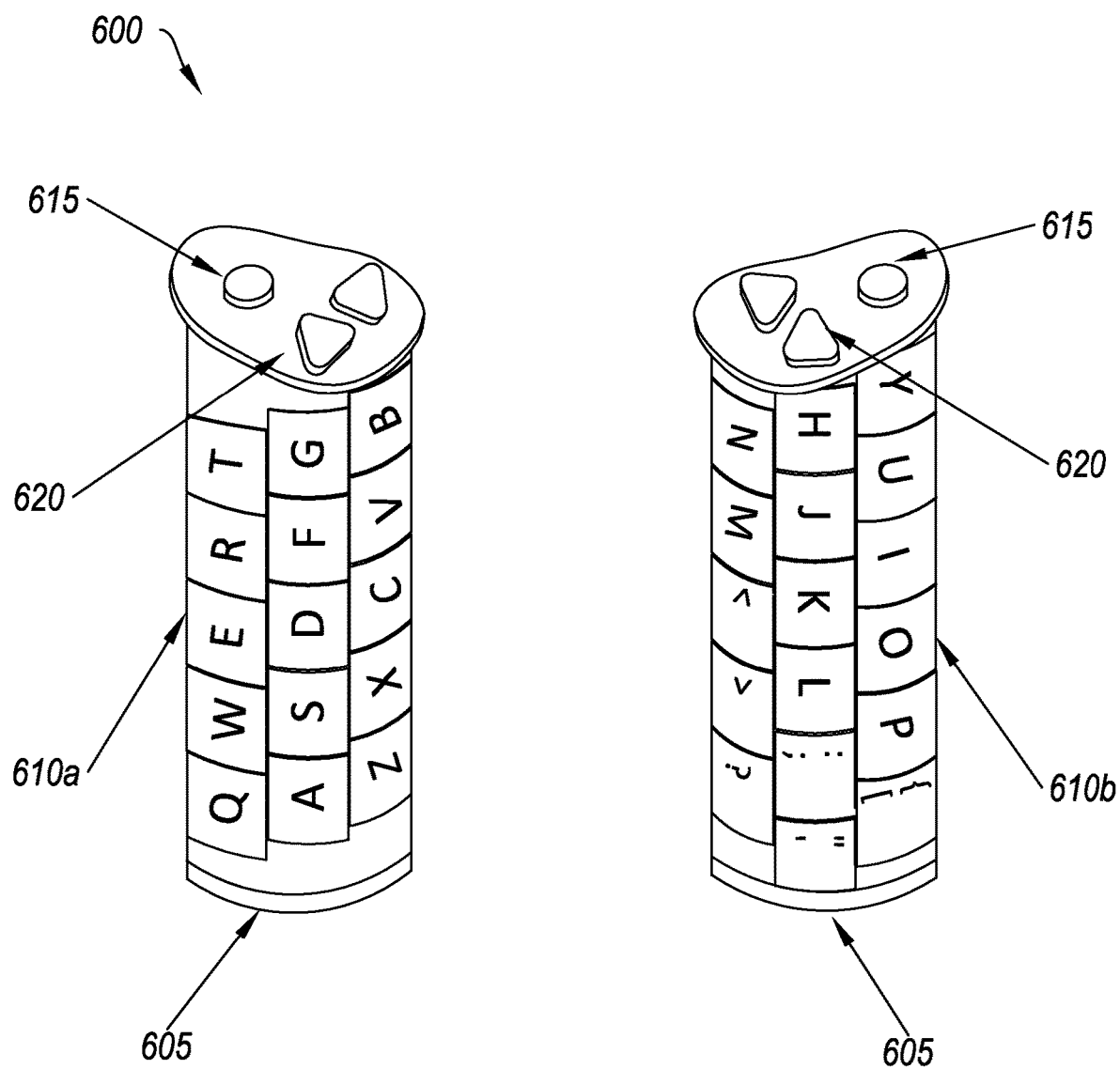
FIG. 6 illustrates a keyboard panel for typing on a handle.

FIG. 6 illustrates a keyboard panel 600 for typing on a handle 605. In at least one implementation, the keyboard panel 600 can be wrapped around a roughly cylindrical or elliptically shaped handle 605. For example the keypad can be installed on a steering wheel, a hand rest, a mechanical lever, a joystick, a palm supported keyboard device or any other curved handle 605 or device.

FIG. 6 shows that the keyboard panel 600 can include a left-keypad 610a and a right-keypad 610b (collectively "keypads 610"). In at least one implementation, the user can use his/her hands to both grip the handle 605 and type with his/her hands using the horizontal keypads 610. For example, the palm of the user's hand can positioned opposite the side of the handle 605 from the keypads 610. The fingers of the user's hand can wrap around to the keypads 610 where they can be used to make keystrokes. The keypads 610 can comprise a full QWERTY keyboard or the core keys of a QWERTY keyboard, as described above.

FIG. 6 also shows that the keyboard panel 600 can include a touch sensitive button 615 and navigation buttons 620. In at least one implementation, the touch sensitive button 615 and the navigation buttons 620 can be controlled by the user's thumbs. That is, the user can user his or her thumbs to navigate using the touch sensitive button 615 and the navigation buttons 620 while typing on the keypads 610 or otherwise gripping the handle 605.

Figure 7:
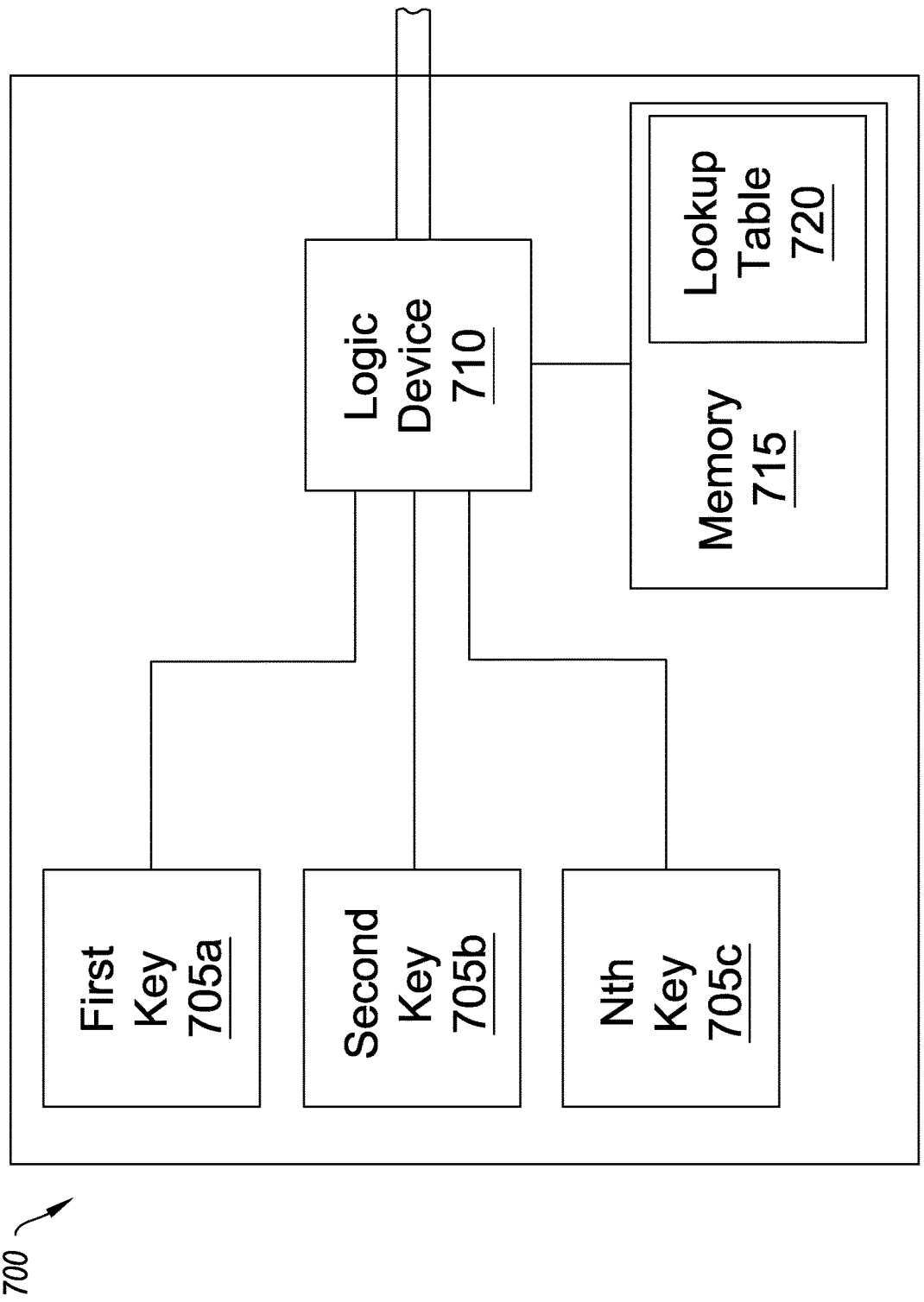
FIG. 7 illustrates an example of a system for providing modifier keys in a keyboard.

FIG. 7 illustrates an example of a system 700 for providing modifier keys in a keyboard. In at least one implementation, modifier keys allow one key to be used for inputting multiple characters or commands. For example, on a standard keyboard, pushing the "Shift" key will modify the character input by a subsequent keystroke.

FIG. 7 shows that the system 700 includes a first key 705a, a second key 705b and an Nth key 705c (collectively "keys 705"). In at least one implementation, the keys 705 or buttons act as mechanical levers or electronic switches. The keys 705 can have characters engraved or printed thereon and each press of a key 705 can correspond to a single written symbol. However, as described below, pressing and holding several keys 705 simultaneously or in sequence can produce a signal which a single key 705 alone is unable to produce. For example, pressing a single key 705 can produce letters, numbers or signs (characters) while other keys or simultaneous key presses can produce actions or computer commands.

FIG. 7 also shows that the keys 705 are connected to a logic device 710. In at least one implementation, a logic device 710 can include any device capable of performing logic functions. For example, the logic device 710 can perform Boolean logic or can produce a pre-determined output based on input. The logic device can include ROM memory, programmable logic device (PLD), programmable array logic (PAL), generic array logic (GAL), complex programmable logic device (CPLD), field programmable gate arrays (FPGA), logic gates, processors or any other device capable of performing logic functions.

In at least one implementation, the logic device 710 can receive multiple inputs from the keys 705. The logic device 710 can differentiate between when the keys 705 are pressed and when the keys 705 are released. For example, a signal from the first key 705a can be "on" when the first key 705a is pressed and "off" when the first key 705a is released. The logic device 710 can detect the transition from off to on or from on to off to determine when the keys 705 are pressed or released, respectively.

In at least one implementation, the logic device 710 can "hold" the signal when a key is pressed, or wait to output the signal, until the key is released. Holding the signal can allow the logic device 710 to modify the output signal if the second key 705b is pressed simultaneously with the first key 705a. As used in the claims and the specification, the second key 705b pressed simultaneously with the first key 705a means that the first key 705a is pressed and is not released before the second key 705b is pressed. I.e., both the first key 705a and the second key 705b are pressed before either the first key 705a or the second key 705b is released.

In at least one implementation, the logic device 710 holding the signal allows the first key 705a to serve as a modifier of the second key 705b and the second key 705b to serve as a modifier of the first key 705a. In particular, the logic device 710 can output a first signal if the first key 705a is pressed and released before any other keys 705 are pressed; can output a second signal if the first key 705a is pressed and the second key 705b is pressed before the first key 705a is released; can output a third signal if the second key 705b is pressed and the first key 705a is pressed before the second key 705b is released; and can output a fourth signal if the second key 705b is pressed and released before any other keys 705 are pressed. One of skill in the art will appreciate that the logic device 710 holding the signal can mean that a keystroke is not recorded until the keys 705 are released.

FIG. 7 shows that the system 700 can include a memory 715. In at least one implementation, the memory 715 can include any device capable of storing data in computer readable form. The memory 715 can include volatile memory and non-volatile memory. Volatile memory can include dynamic random access memory (DRAM), static random access memory (SRAM), thyristor random access memory (T-RAM), zero capacitor random access memory (Z-RAM), twin transistor random access memory (TTRAM), delay line memory, selectron tube and williams tube. Non-volatile memory can include read-only memory (ROM), programmable read only memory (PROM), erasable programmable read only memory (EPROM), electrically erasable programmable read only memory (EEPROM), flash memory, ferroelectric random access memory (FeRAM), magnetoresistive random access memory (MRAM), phase change random access memory (PRAM, aka PCM, PRAM, PCRAM, ovonic unified Memory, chalcogenide random access memory and C-RAM), conductive-bridging random access memory (CBRAM aka. programmable metallization cell or PMC), silicon-oxide-nitride-oxide-silicon (SONOS), resistive random-access memory (RRAM), racetrack memory, nano random access memory (NRAM), millipede, drum memory, magnetic core memory, plated wire memory, bubble memory and twistor memory.

In at least one implementation, the memory can include a lookup table 720. The lookup table 720 can include a list of output signals for the logic device 710 to output based on the keys 705 pressed. I.e., the lookup table 720 can include the ways in which the first key 705a is able to modify the second key 705b and vice versa. The lookup table 720 can be updated by a user to change the output of modified keys.

Table 1 includes a list of default modifier keys that could be found in the lookup table 720.

TABLE 1

| Initiators (Press and Hold) | Group | Output | Subject key |
|---|---|---|---|
| Main Menu | | | |
| X or Period. | | On screen menu Navigation-Direction-Delete | Any other key |
| D and K | | Space/overwrites in insert mode | D and k |
| D or K | | Delete Left, Right | j or ; |
| R | | aRRows left right | j or ; |
| R | | Page up/down | p or / |

TABLE 1-continued

| Initiators (Press and Hold) | Group | Output | Subject key |
|---|---|---|---|
| R | | Home/End | h or ' |
| T/U | | Tab/touchpad keys | j or ; |
| | | Shift/Lock-Toggle | |
| S or L | Mnemonic mirror | Shift | Any other key |
| Q + P | Lock/toggle bi-sequence | Caps lock | q and p |
| q + n or v | Lock, toggle bi-sequence | NumLock | Q and n or v |
| q + l or s | Lock, bi-sequence | Scroll Lock | q and L or s |
| A or Semicolon; | Mnemonic/ Mirror | Alt | |
| C or Comma, | Mnemonic/ mirror | Control | |
| W or O | Mnemonic/ mirror | Windows | Any other key |
| G or h | Repeat | Repeat any key | Any key |
| | | Numeric-Function | |
| V or n | Both hands/ numerals | Numerals | Qwe rty uiop 123 456 7890 |
| V or n | Right hand numeric keypad | Numerals/math signs | nM,. hjkl; ' uiop[ nqwe hrty; ' uiop[ *123/ −456+ ent 7890= |
| V or n | Left hand phone keypad | Numerals/phone/ left hand | left handed phone keypad qwe asd zxcv 123 456 7890 |
| F or j | Mnemonic/ Mirror | Function key | *# Call Back Qwe rty uio p[' 123 456 789 10, 11, 12 |
| | | Action-Enter | |
| E or I | | Enter/Escape | ' or h |
| E or I | | Right click/Left Click | ; or j |
| E or I | | Pause | p |
| E or I | | Break | b |
| E or I | | inseRt | r |
| E or I | | prinT Screen | t |
| E or I | | sYsReq | y |
| | | Symbols- Punctuation | |
| Z or Slash(/) | Symbols: Mnemonics: Character, positional sequence, | Back quote, Tilde, Exclamation point, At, Number sign, Dollar sign, peRcent, Caret, aMpersand, aSterisk, Parenthesis left, Parenthesis right, bracket left, bracKet right, brace left, brace right, Vertical bar, Backslash. | q t x a n d r c m s j ; k l h ' v b or [ |

In at least one implementation, the logic device 710 is configured to receive a signal from one or more keys. The logic device then accesses the lookup table 720 in the memory 715 to determine the correct output signal based on the keystroke combination.

In at least one implementation, the system 700 can include a display. In particular, the display can include an illustration of a keyboard. The display keyboard can be used to assist a user. For example, the display keyboard can highlight keys as they are pressed on the physical keyboard. Additionally or alternatively, the display can include a help function. For example, as a first key is pressed, the help could display keys which can potentially be modified by the first key and show the outputs that would be produced by each key.

Figure 8:
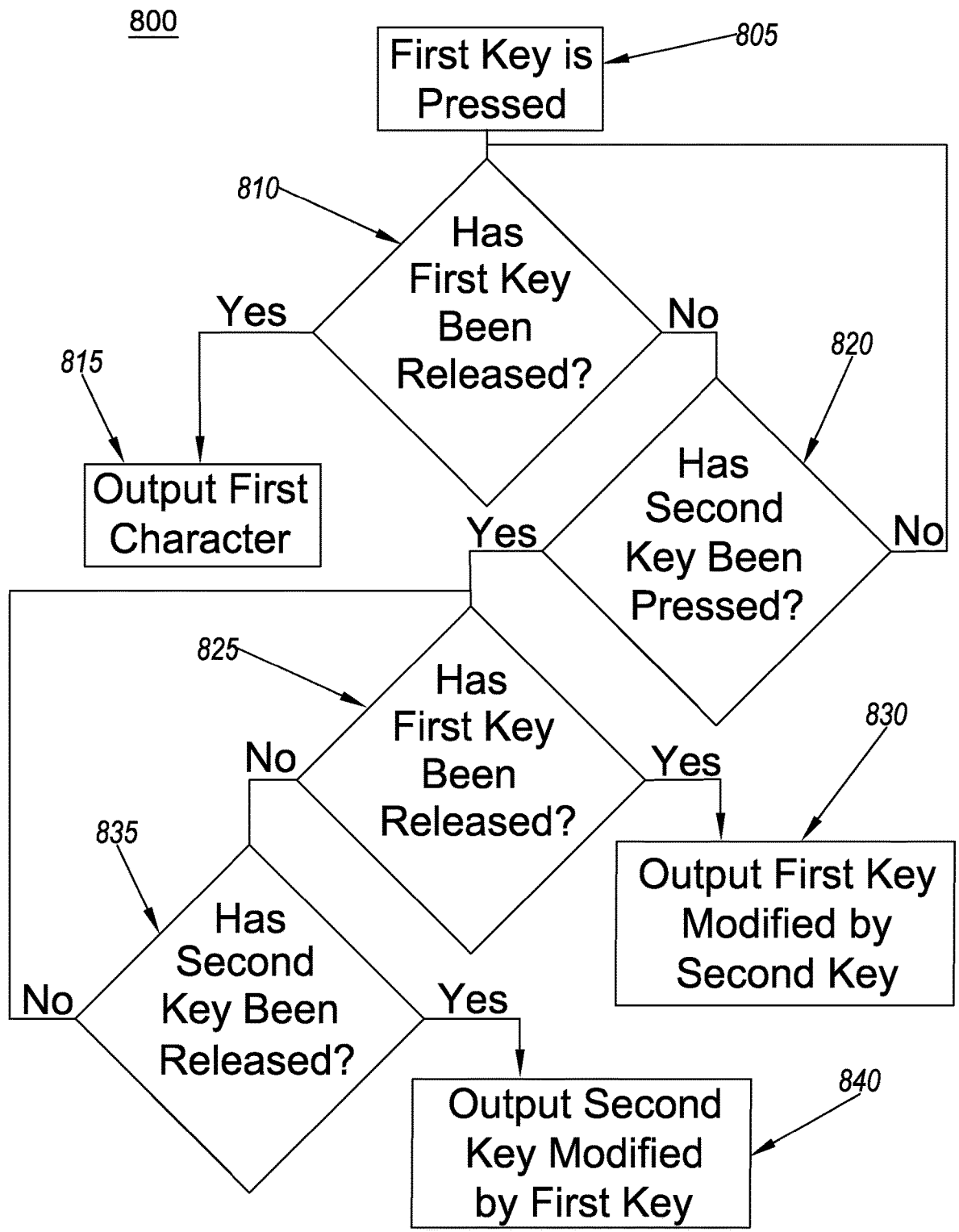
FIG. 8 is a flowchart illustrating an example of a method for determining the output of a system for providing modifier keys in a keyboard.

FIG. 8 is a flowchart illustrating an example of a method 800 for determining the output of a system for providing modifier keys in a keyboard. In at least one implementation, modifier keys allow one key to be used for inputting multiple characters or command. One of skill in the art will appreciate that the method 800 can be used in the system 700 of FIG. 7; however, the system 700 of FIG. 7 should not be seen as limiting the method 800.

FIG. 8 shows that the method 800 includes determining when a first key is pressed 805. Determining when a first key is pressed 805 can be accomplished by the first key completing an electrical circuit, thus allowing an electrical signal to be produced. Additionally or alternatively, a logic device can be used to determine when a first key is pressed 805 and/or released. Additionally or alternatively, key determining when a first key is pressed 805 can be indicated by change in circuit voltage, frequency input from each key, or laser scanning of a code from a reflector on each key as it is moved.

FIG. 8 also shows that the method 800 can include determining whether the first key has been released 810. Determining whether the first key has been released 810 can be accomplished by detecting the cessation of the electrical signal that is produced by the first key completing the electrical signal, as discussed above. Additionally or alternatively, a logic device can differentiate between when the keys are pressed and when the keys are released. For example, a signal from the keys 705 can be "on" when the keys 705 are pressed and "off" when the keys 705 are released. The logic device can detect the transition from off to on or from on to off to determine when the keys are pressed or released, respectively.

FIG. 8 further shows that the method 800 can include outputting the first key character 815 if the first key has been released. In at least one implementation, the first key being released without other keys being pressed indicates that the first key is the only key that has been pressed. I.e., the user has pressed and released only the first character. Therefore, the first key character is intended as the output.

FIG. 8 also shows that the method 800 can include determining whether a second key has been pressed 820 if the first key has not been released. In at least one implementation, determining whether a second key 820 has been pressed will differentiate between when the first key is meant to modify the second key and when the first key is meant to output the first character.

FIG. 8 further shows that the method 800 includes determining if the first key has been released 825. FIG. 8 also shows that the method 800 can include outputting the first key modified by the second key 835. In at least one implementation, the output can be different when the first key is released if a second key has been pressed and if no other keys have been pressed. That is, the output of the first key can be modified depending on whether a second key has been pressed or not.

FIG. 8 further shows that the method 800 can include determining if the second key has been released 835. In at least one implementation, determining if the second key has been released 835 can be determined in the same manner as determining if the first key has been released 810. Additionally or alternatively, determining if the second key has been released 835 can be determined in a different manner than determining if the first key has been released.

FIG. 8 further shows that the method 800 can include outputting the second key modified by the first key 840 when a second key has been pressed. In at least one implementation, modifying the second key with the first key can allow a device to include a keyboard that has fewer keys, since specific function keys are not needed because each key, including alphabetic and numeric keys, can modify other keys. This can in turn, reduce the footprint of the keyboard when space on the device is limited, such as mobile devices.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 9:
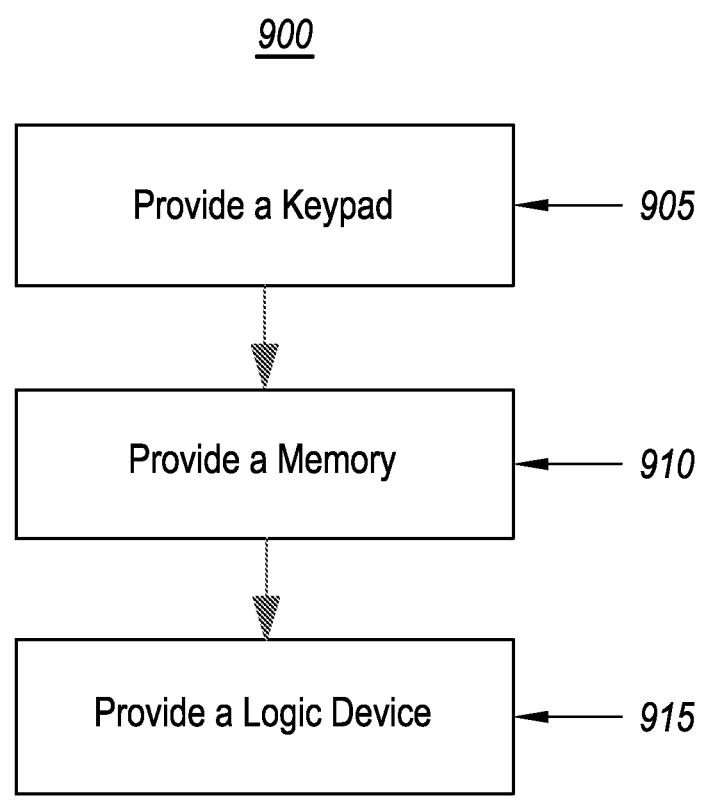
FIG. 9 is a flowchart illustrating an example of a method of manufacturing a system for providing input on a mobile device.

FIG. 9 is a flowchart illustrating a method 900 of manufacturing a system for providing input on a mobile device. One of skill in the art will appreciate that the method 900 can be used to produce the system 700 of FIG. 7; however, the method 900 can be used to produce systems other than the system 700 of FIG. 7.

FIG. 9 shows that the method 900 includes providing a keypad 905. In at least one implementation, the keypad can include a set of keys. For example, the keys can be arranged in a QWERTY arrangement. Additionally or alternatively, the set of keys can include only the core keys of a QWERTY keyboard. Additionally or alternatively, the keypad can include a telephone keypad or a dedicated numeric keypad.

FIG. 9 shows that the method 900 can also include providing a memory 910. In at least one implementation, the memory can include any device capable of storing data in computer readable form. The memory can include a lookup table. The lookup table can include a list of output signals for the logic device to output based on the keys pressed. I.e., the lookup table can include the ways in which a first key is able to modify a second key and vice versa. For example, the lookup table can include the modifier keys of table 1. Additionally or alternatively, the lookup table can be updated by a user to change the output of modified keys.

FIG. 9 shows that the method 900 can further include providing a logic device 915. In at least one implementation, a logic device can include any device capable of performing logic functions. For example, the logic device can perform Boolean logic or can produce a pre-determined output based on input. In at least one implementation, the logic device can receive multiple inputs from the keys. The logic device can differentiate between when the keys are pressed and when the keys are released. For example, a signal from the first key 705a can be "on" when a first key is pressed and "off" when the first key is released. The logic device can detect the transition from off to on or from on to off to determine when the keys are pressed or released, respectively.

In at least one implementation, the logic device is configured to receive a signal from one or more keys. The logic device then accesses the lookup table in the memory to determine the correct output signal based on the keystroke combination.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A handheld mobile keyboard device comprising:
   a keyboard panel having a front linear side and two linear lateral sides substantially perpendicular to said front linear side, a first keypad and a second keypad and said first and said second keypads are segmented and each said keypad has a front edge that is linear,
   wherein said first keypad includes a first set of keys for input to a handheld mobile device; and said second keypad that includes a second set of keys for input to said handheld mobile device;
   a first swivel, wherein said first swivel is attached to said first keypad at an eccentric location, and said first swivel is configured to allow rotation of said first keypad at least 90 degrees and to position said first keypad from a first location to a second location and, when in said first location, said front edge of said first keypad is parallel with said front linear side of said keyboard panel, and when in said second location said front edge of said first keypad is parallel with one said lateral side of said keyboard panel and a distance between said front edge of said first keypad and said front linear side of said keyboard panel in said first location is greater than a distance between said front edge of said first keypad and said lateral side of said keyboard panel in said second location, wherein said distance between the front edge of said first keypad and the front linear side of the keyboard panel provides a wrist support region when said first keypad is in said first location and a second swivel, wherein said second swivel is attached to said second keypad at an eccentric location, and said second swivel is configured to allow rotation of said second keypad at least 90 degrees and to position said second keypad from a third location to a fourth location, and, when in said third location, said front edge of said second keypad is parallel with said front linear side of said keyboard panel, and wherein in said fourth location said front edge of said second keypad is parallel with the other said lateral side of said keyboard panel and a distance between said front edge of said second keypad and said front linear side of said keyboard panel in said third location is greater than a distance between said front edge of second keypad and the other said lateral side of said keyboard panel in said fourth location.

2. The device of claim 1, wherein said keyboard panel includes a QWERTY keyboard.

3. The device of claim 2, wherein the first keypad of said keyboard panel includes left-hand keys of the QWERTY keyboard.

4. The device of claim 2, wherein the second keypad of the keyboard panel includes right-hand keys of the QWERTY keyboard.

5. The device of claim 1, wherein said keyboard panel includes core keys of a QWERTY keyboard.

6. The device of claim 5, wherein the said first keypad includes left-hand core keys of the QWERTY keyboard.

7. The device of claim 6, wherein the said second keypad includes right-hand core keys of the QWERTY keyboard.

8. The device of claim 1 further comprising a display panel and a hinge, wherein said display panel and keyboard panel comprise said handheld mobile device, wherein said hinge is configured to allow said keyboard panel to move from a first open position, wherein said display panel and keyboard panel are oriented at an angle, to a closed position wherein said display panel is oriented to face opposite a direction of orientation of keys on said keyboard panel.

9. The device of claim 1 further comprising a logic device to receive signals from said keypads.

10. The device of claim 9, wherein the logic device is configured to modify an output signal of a first depressed key if a second key is depressed prior to the release of said first depressed key.

11. A mobile device comprising a screen display and a keyboard, wherein said keyboard is configured to allow a user to conventionally type and back type on said mobile device, said mobile device further comprising:

a front panel having a top surface and a bottom surface, wherein said screen display is on said top surface;

a keyboard panel, said keyboard panel having a top surface, a bottom surface, a linear front side and opposite linear lateral sides, wherein said keyboard panel includes:

a first keypad, wherein the first keypad includes: a linear front edge, a first set of keys; and a first swivel, wherein the first swivel is configured to allow the user to rotate said first keypad in a plane parallel to a second plane defined by said keyboard panel at least 90 degrees and to orient said first keypad to a second location adjacent to a first linear lateral side of said keyboard panel; and a second keypad, wherein the second keypad includes: a linear front edge, a second set of keys; and a second swivel, wherein the second swivel is configured to allow the user to rotate the second keypad in the plane parallel to said second plane defined by said keyboard panel at least 90 degrees and to orient said second keypad to a second location adjacent to a second lateral side of said keyboard panel; and a hinge, wherein said hinge connects said keyboard panel to said first panel and is configured to allow the user to move said keyboard panel from an open position to a closed position wherein when said keyboard panel is in said closed position, a user can manipulate the keys while holding and supporting the mobile device while maintaining their hands in a fixed position, and said first swivel is attached to said first keypad at an eccentric location, and configured to provide the ability to position said first keypad from a first location to the second location and, when in said first location, said front edge of said first keypad is parallel with said front side of said keyboard panel, and when said first keypad is in said second location said front edge of said first keypad is parallel with said first linear lateral side of said keyboard panel and a distance between said front edge of said first keypad and said front side of said keyboard panel in said first location is greater than a distance between said front edge of said first keypad and said first linear lateral side of said keyboard panel in said second location, wherein said distance between the front edge of said first keypad and the front side of the keyboard panel provides a wrist support region when said first keypad is in said first location and said second swivel is attached to said second keypad at an eccentric location and to position said second keypad from a first location to the second location, and, when in said first location, said front edge of said second keypad is parallel with said front side of said keyboard panel, and wherein in said second location said front edge of said second keypad is parallel with said second linear lateral side of said keyboard panel and a distance between said front edge of said second keypad and said front side of said keyboard panel in said first location is greater than a distance between said front edge of said second keypad and the second linear lateral side of said keyboard panel in said second location.

12. The mobile device of claim 11, wherein the mobile device comprises a cell phone.

13. The mobile device of claim 11, wherein the mobile device comprises a laptop computing device.

14. The mobile device of claim 11, wherein the mobile device comprises a tablet personal computer.

15. The mobile device of claim 11, wherein the hinge includes a double hinge, wherein the double hinge is configured to allow the keyboard panel to lie flat on the rear surface of said screen display.

16. The mobile device of claim 11, wherein: the first swivel is configured to allow 360 degree rotation of the first keypad; and the second swivel is configured to allow 360 degree rotation of the second keypad.

17. The mobile device of claim 16, wherein said keypads are on quadrilateral supports.

18. A handheld mobile keyboard comprising:

a keyboard panel having a front linear side, a rear linear side and opposite lateral sides, and having a first keypad and a second keypad connected to said keyboard panel, and wherein first and said second keypads are segmented and each keypad include a front side and a plurality of keys for input, wherein said first keypad is mounted on said keyboard panel with a first swivel wherein said first swivel is attached to said first keypad at an eccentric location, and said first swivel is configured to allow rotation of said first keypad on said keyboard panel at least 90 degrees and to position said first keypad from a first location to a second location wherein when said first keypad is in said first location, a distance from a front of said first keypad to the front linear side of said keyboard panel is greater than a distance from the front of the first keypad to a lateral side of the keyboard panel when the first keypad is in said second location, wherein said distance between the front of said first keypad and the front linear side of the keyboard panel provide a wrist support region when said first keypad is in said first location, and wherein said second keypad is mounted on said keyboard panel with a second swivel, wherein said second swivel is attached to said second keypad at an eccentric location, and said second swivel is configured to allow rotation of said second keypad on said keyboard panel at least 90 degrees and to position said second keypad from a third location to a fourth location, wherein when said second keypad is in said third location, a distance from the front of said second keypad to the front side of said keyboard panel is greater than a distance from the front of the second keypad to the other lateral side of the keyboard panel when said second keypad is in said fourth location.

\* \* \* \* \*